United States Patent
Oshita et al.

(10) Patent No.: US 10,527,010 B2
(45) Date of Patent: Jan. 7, 2020

(54) CONTROL SYSTEM FOR INTERNAL COMBUSTION ENGINE

(71) Applicant: KABUSHIKI KAISHA TOYOTA JIDOSHOKKI, Kariya-shi, Aichi-ken (JP)

(72) Inventors: Makio Oshita, Aichi-ken (JP); Toshihiro Yamamichi, Aichi-ken (JP); Satoshi Umemura, Aichi-ken (JP)

(73) Assignee: KABUSHIKI KAISHA TOYOTA JIDOSHOKKI, Toyota-shi, Aichi (JP)

( * ) Notice: Subject to any disclaimer, the term of this patent is extended or adjusted under 35 U.S.C. 154(b) by 25 days.

(21) Appl. No.: 15/838,918

(22) Filed: Dec. 12, 2017

(65) Prior Publication Data

US 2018/0163675 A1    Jun. 14, 2018

(30) Foreign Application Priority Data

Dec. 13, 2016 (JP) .................... 2016-241609

(51) Int. Cl.
| | |
|---|---|
| F02B 37/04 | (2006.01) |
| F02B 39/10 | (2006.01) |
| F02D 41/00 | (2006.01) |
| F02M 26/03 | (2016.01) |
| F02M 26/49 | (2016.01) |
| F02M 26/53 | (2016.01) |
| F02D 23/00 | (2006.01) |

(52) U.S. Cl.
CPC ............. *F02M 26/53* (2016.02); *F02D 23/00* (2013.01); *F02M 26/03* (2016.02); *F02M 26/49* (2016.02)

(58) Field of Classification Search
CPC .......... F02B 33/40; F02B 37/04; F02B 39/10; F02B 39/16; F02B 77/04; F02D 23/00; F02D 41/0007; F02D 41/0042; F02M 26/03; F02M 26/05; F02M 26/49; F02M 26/50; F02M 26/53; Y02T 10/144
USPC ........................................ 60/280, 602, 605.2
See application file for complete search history.

(56) References Cited

U.S. PATENT DOCUMENTS

| | | | |
|---|---|---|---|
| 7,552,705 B2 * | 6/2009 | Serkh ............... | B60K 6/28 123/179.4 |
| 2005/0044873 A1 * | 3/2005 | Tamai ............... | B60H 1/004 62/323.1 |

(Continued)

FOREIGN PATENT DOCUMENTS

| | | |
|---|---|---|
| JP | 2008-057489 A | 3/2008 |
| JP | 2012-102670 A | 5/2012 |

(Continued)

*Primary Examiner* — Patrick D Maines
*Assistant Examiner* — Dapinder Singh
(74) *Attorney, Agent, or Firm* — Sughrue Mion, PLLC

(57) ABSTRACT

A control system for an internal combustion engine includes an electric supercharger that includes a compressor wheel that is configured to be rotated by an electric motor. The control system includes a bypass passage, a bypass valve, and an exhaust gas recirculation passage. The control device is configured to control the electric supercharger and the bypass valve based on an operation condition of the internal combustion engine. The control device is configured to cause a stepping operation of the electric supercharger in which acceleration and stopping of the compressor wheel are repeated within a predetermined cleaning time after operation of the internal combustion engine is stopped.

4 Claims, 4 Drawing Sheets

(56) References Cited

U.S. PATENT DOCUMENTS

| | | | |
|---|---|---|---|
| 2008/0217083 A1* | 9/2008 | Serkh | B60K 6/28 |
| | | | 180/165 |
| 2013/0291537 A1 | 11/2013 | Kobayashi | |
| 2018/0141092 A1 | 5/2018 | Davies et al. | |

FOREIGN PATENT DOCUMENTS

| | | |
|---|---|---|
| JP | 2015-203309 A | 11/2015 |
| WO | 2016/186525 A1 | 11/2016 |

* cited by examiner

CONTROL SYSTEM FOR INTERNAL COMBUSTION ENGINE

BACKGROUND

The present disclosure relates to a control system for an internal combustion engine equipped with an electric supercharger.

An exhaust gas recirculation (EGR) system, for a vehicle equipped with an internal combustion engine, reduces nitrogen oxide emissions by recirculating exhaust gas into intake gas for environmental protection. In a diesel engine equipped with an EGR system, particulate matter (PM) and wet soot (WS) that accumulate as deposit on parts that form the internal combustion engine may cause degradation in the performance of such parts. Various cleaning methods have been proposed to remove deposit that has accumulated on parts that form the internal combustion engine.

Japanese Patent Application Publication 2008-057489 mentions a diesel engine that has an intake passage and an exhaust passage provided with an EGR cooler and an intercooler, and removes particulate matter accumulated on the EGR cooler. In the diesel engine of the Publication, a cleaning passage is formed by controlling the operation of valves disposed in the intake and exhaust passages, and cleaning to remove particulate matter accumulated on the EGR cooler is performed after a stop.

Japanese Patent Application Publication 2012-102670 mentions an EGR system that closes an EGR passage in response to an engine stop advance signal to stop the flow of exhaust gas from the EGR passage into an intake passage just before the engine stops. Then, the rotation speed of a turbine shaft is increased thereby to increase the blowing force of the compressor. This EGR system permits not only removing deposit accumulated on the compressor wheel and the intercooler by the blowing force, but also removing deposit accumulated on the compressor wheel by the centrifugal force.

In a vehicle having an internal combustion engine which is equipped with both a turbocharger and an electric supercharger, the electric supercharger is driven to supplement supercharging when supercharging provided only by the turbocharger is insufficient. In such internal combustion engines equipped with an electric supercharger, if the EGR passage is connected to the intake passage at a position that is upstream of the electric supercharger, there is a fear that particulate matter in emission may be accumulated on the compressor wheel of the electric supercharger, a bearing, and a sealing member of the electric motor. Since accumulation of deposit on the electric supercharger causes degradation in supercharging performance and an increase of sliding resistance, there is a need for deposit to be removed.

The present invention provides a control system of an internal combustion engine that removes deposit that is accumulated on an electric supercharger of the internal combustion engine.

SUMMARY

In accordance with an aspect of the present disclosure, there is provided control system for an internal combustion engine includes an electric supercharger that is disposed in an intake passage of the internal combustion engine and that includes a compressor wheel that is configured to be rotated by an electric motor, a bypass passage having a first end that is connected to a first part of the intake passage that is upstream of the electric supercharger, and a second end that is connected to a second part of the intake passage that is downstream of the electric supercharger to thereby permit bypass of the electric supercharger via the bypass passage. The control system further includes a bypass valve that is disposed in the bypass passage and is configured to open and close the bypass passage, an exhaust gas recirculation passage connecting an exhaust passage of the internal combustion engine and the first part of the intake passage that is upstream of the electric supercharger, and a control device configured to control the electric supercharger and the bypass valve based on an operating condition of the internal combustion engine. The control device is configured to cause a stepping operation of the electric supercharger in which acceleration and stopping of the compressor wheel are repeated within a predetermined cleaning time after operation of the internal combustion engine is stopped.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the embodiments together with the accompanying drawings in which.

DETAILED DESCRIPTION OF THE EMBODIMENTS

Figure 1:
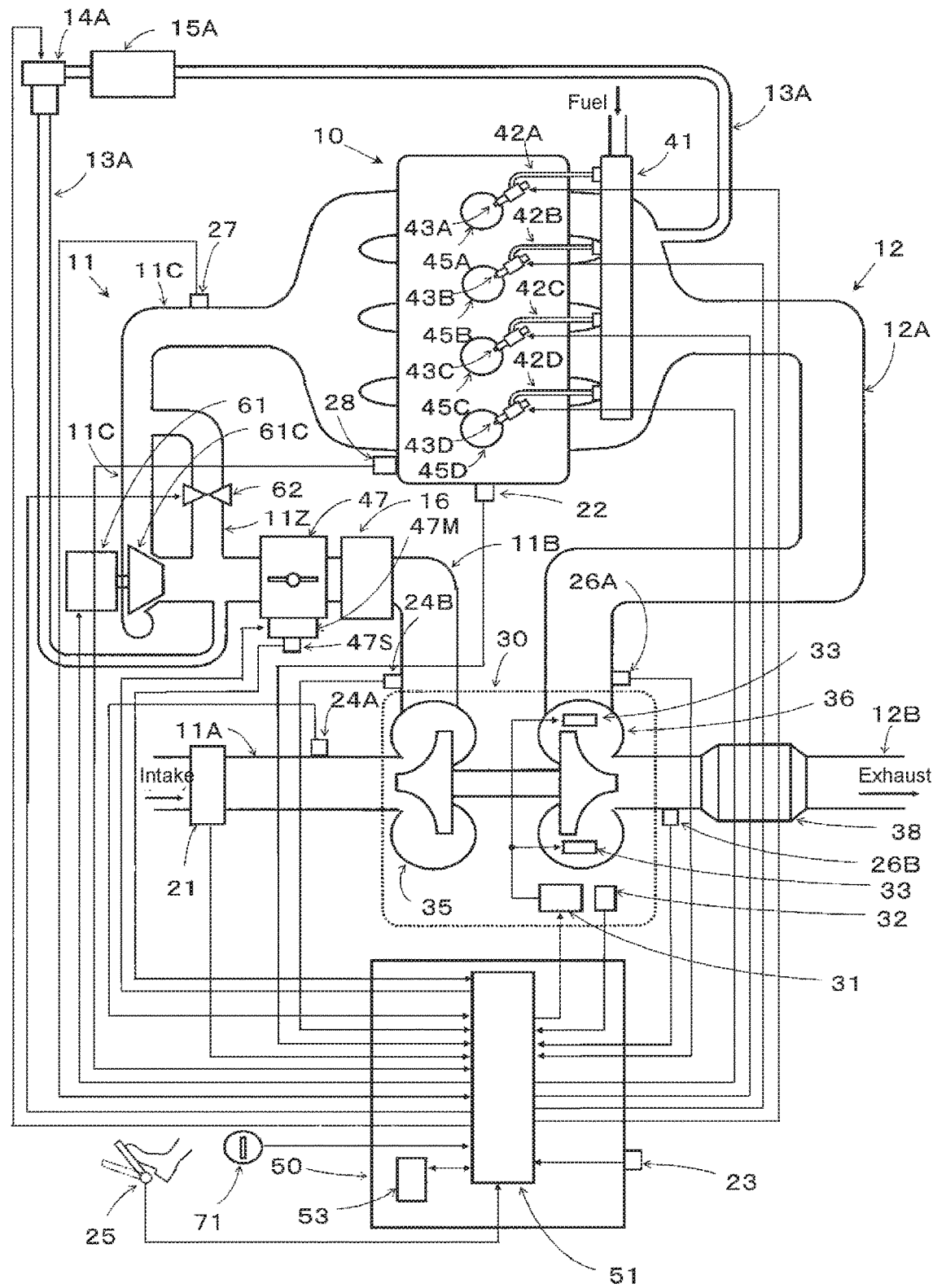
FIG. 1 is a schematic overall view of a control system of an internal combustion engine according to an embodiment.

The following will describe an embodiment of the present disclosure with reference to accompanying drawings. First, the overall configuration of a control system of an internal combustion engine mounted on a vehicle will be described. FIG. 1 depicts a diesel engine 10 having four cylinders 45A, 45B, 45C, 45D. The diesel engine (hereinafter simply referred to as engine 10) corresponds to the internal combustion engine mounted on a vehicle according to the present embodiment. An intake passage 11 is connected to the engine 10 and supplies intake air to the cylinders 45A, 45B, 45C, 45D of the engine 10. An exhaust passage 12 is also connected to the engine 10 and permits discharge of exhaust gas from the cylinders 45A, 45B, 45C, 45D of the engine 10. The cylinders 45A, 45B, 45C, 45D are provided with injectors 43A, 43B, 43C, 43D connected to a common rail 41 through fuel pipes 42A, 42B, 42C, 42D, respectively. A turbo compressor 35 of a turbocharger 30 and a compressor wheel 61C of an electric supercharger 61 are disposed in the intake passage 11, and a turbine 36 of the turbocharger 30 and an exhaust cleaning device 38 are disposed in the exhaust passage 12. In other words, the electric supercharger 61 including the compressor wheel 61C is disposed in the intake passage of the engine 10. The intake passage 11 includes a first intake passage 11A, a second intake passage 11B, and a third intake passage 11C that are disposed in this order as viewed from the upstream end of the intake passage 11. The exhaust passage 12 includes a first exhaust passage 12A and a second exhaust passage 12B that is located downstream of the first exhaust passage 12A with respect to the direction in which the exhaust gas flows in the exhaust passage 12. The engine 10 includes a control device 50 having therein a controller 51 and a memory 53.

A flow rate detector 21 is disposed in the first intake passage 11A on the upstream side thereof, and the downstream end of the first intake passage 11A is connected a to an inlet port of the turbo compressor 35 of the turbocharger 30. The flow rate detector 21 detects the flow rate of intake air, generates a detection signal indicative of the detected flow rate, and provides the detection signal to the controller 51. The controller 51 determines the flow rate of the intake air being drawn to the engine 10 based on the detection signal received from the flow rate detector 21. A pressure detector 24A (e.g., a pressure sensor, a sensor, a detector, and/or the like) is disposed in the first intake passage 11A between the flow rate detector 21 and the turbo compressor 35 and detects the pressure of intake air, generates a detection signal indicative of the detected pressure, and provides the detection signal to the controller 51. The controller 51 determines the intake pressure, at a position that is upstream of the turbo compressor 35 in the first intake passage 11A, based on the detection signal received from the pressure detector 24A.

The upstream end of the second intake passage 11B is connected to the outlet port of the turbo compressor 35 of the turbocharger 30, and the downstream end of the second intake passage 11B is connected to an inlet port for the compressor wheel 61C of the electric supercharger 61. With the turbo compressor 35 being driven by the turbine 36, intake air in the first intake passage 11A is compressed (e.g., supercharged) as the intake air flows to the second intake passage 11B. An intercooler 16 and a throttle device 47 are disposed in the second intake passage 11B. The intercooler 16 cools the compressed intake air to permit the volume of the intake air to be reduced and the density of the oxygen in the intake air to be increased.

The throttle device 47 includes a throttle motor 47M and a throttle opening detector 47S (e.g., an angular sensor, a sensor, a detector, and/or the like) that detects the angular position of the throttle valve. An accelerator pedal detector 25 (e.g., an accelerator pedal angular sensor, a sensor, a detector, and/or the like) is provided to detect the degree of depression of the accelerator pedal that is operated by a driver. The controller 51 calculates a target throttle valve angular position based on the detected degree of depression of the accelerator pedal and an operating condition of the engine 10. While monitoring the angular position of the throttle valve using information received from the throttle opening detector 47S, the controller 51 controls the throttle motor 47M to rotate the throttle valve to a position that corresponds to a target throttle valve angular position. A pressure detector 24B (e.g., pressure sensor, a sensor, a detector, and/or the like), that is disposed in the second intake passage 11B, detects the pressure of intake air, and generates a detection signal that is indicative of the detected intake air pressure. The controller 51 determines the pressure of the intake air, at a location downstream of the turbo compressor 35, based on a detection signal received from the pressure detector 24B.

A first end of an EGR passage 13A is connected to the first exhaust passage 12A, and a second end of the EGR passage 13A is connected to the second intake passage 11B. In other words, the EGR passage 13A connects the exhaust passage 12 and a part of the intake passage 11 that is upstream of the electric supercharger 61. The EGR passage 13A allows part of the exhaust gas in the first exhaust passage 12A to recirculate into the second intake passage 11B, which improves cleanliness of emissions from the vehicle. An EGR cooler 15A and an EGR valve 14A are disposed in the EGR passage 13A. Coolant is supplied to the EGR cooler 15A for the cooling of exhaust gas. Exhaust gas is cooled by the EGR cooler 15A using a coolant, and is then discharged. The EGR valve 14A is operable to adjust the opening of the EGR passage 13A based on a control signal received from the controller 51. A first end of a bypass passage 11Z is connected to the second intake passage 11B of the intake passage 11, and a second end of the bypass passage 11Z is connected to an intermediate position of the third intake passage 11C. In this way, the compressor wheel 61C is bypassed by the bypass passage 11Z. In other words, the bypass passage 11Z includes a first end that is connected to a first part of the intake passage 11 that is upstream of the electric supercharger 61, and includes a second end that is connected to a second part of the intake passage 11 that is downstream of the electric supercharger 61 to thereby permit bypass of the electric supercharger 61. A bypass valve (ABV) 62 is disposed in the bypass passage 11Z. The ABV 62 is operated by a control signal received from and generated by the controller 51. The ABV 62 controls the opening and closing of the bypass passage 11Z. In other words, the ABV 62 is configured to open and close the bypass passage 11Z. The compressor wheel 61C is configured to be rotated by an electric motor 61M (FIG. 2) of the electric supercharger 61, and compresses the intake air that flows in the second intake passage 11B. In this way, compressed intake air is delivered to the third intake passage 11C. The ABV 62 is closed while the electric supercharger 61 is operating, and opened when the electric supercharger 61 is not operating.

A first end (e.g., an upstream end) of the third intake passage 11C is connected to the discharge port of the compressor wheel 61C, and a second end (e.g., a downstream end) of the third intake passage 11C is connected to the engine 10. In addition, the bypass passage 11Z is connected to an intermediate part of the third intake passage 11C (e.g., between electric supercharger 61 and an intake manifold of engine 10). A pressure detector 27 (e.g., a pressure sensor, a sensor, a detector, and/or the like) is provided in the third intake passage 11C at a location that is downstream of the above-mentioned intermediate part of the third intake passage 11C or a connection part between the third intake passage 110 and the bypass passage 11Z. The pressure detector 27 generates a detection signal indicative of the detected pressure, and provides the detection signal to the controller 51. Based on the detection signal received from the pressure detector 27, the controller 51 determines the pressure of intake air at a point where the intake air is about to enter the engine 10.

A first end (e.g., an upstream end) of the first exhaust passage 12A is connected to the engine 10, and a second end (e.g., a downstream end) of the first exhaust passage 12A is connected to the inlet port of the turbine 36 of the turbocharger 30. As described above, an end of the EGR passage 13A is connected to the first exhaust passage 12A. A pressure detector 26A (e.g., a pressure sensor, a sensor, a detector, and/or the like), that is provided in the first exhaust passage 12A, generates a detection signal indicative of the pressure detected by the pressure detector 26A, and provides the detection signal to the controller 51. The controller 51 determines the pressure of the exhaust gas at a position that is upstream of the turbine 36 based on the detection signal received from the pressure detector 26A.

A first end (e.g., the upstream end) of the second exhaust passage 12B is connected to the outlet port of the turbine 36 of the turbocharger 30, and a second end (e.g., the downstream end) of the second exhaust passage 12B is connected to the exhaust cleaning device 38. Exhaust gas that flows through the second exhaust passage 12B is cleaned by the exhaust cleaning device 38 (e.g., an oxidation catalyst, a diesel particulate filter (DPF), and/or the like). A pressure detector 26B (e.g., a pressure sensor, a detector, and/or the like), that is provided in the second exhaust passage 12B, generates a detection signal indicative of the detected pressure, and provides the detection signal to the controller 51. The controller 51 determines the pressure of exhaust gas at a position that is downstream of the turbine 36 based on the detection signal received from the pressure detector 26B. The turbine 36 includes a variable nozzle 33 that controls a velocity (e.g., a flow speed) of the exhaust gas that is introduced into the turbine 36. An opening of the variable nozzle 33 is controlled by the driving device 31. A nozzle opening detector 32 (e.g., a nozzle opening degree sensor, a sensor, a detector, and/or the like), that is provided in the turbocharger 30, detects the opening degree of the variable nozzle 33, generates a detection signal that is indicative of the detected opening degree, and provides the detection signal to the controller 51. Based on the detection signal received from the nozzle opening detector 32 and a target opening degree of the variable nozzle 33, the controller 51 generates a control signal, and provides the control signal to the driving device 31 to control the opening degree of the variable nozzle 33.

A rotation detector 22 (e.g., a rotation angle sensor, a sensor, a detector, and/or the like), that is disposed adjacent to the engine 10, detects the rotation speed of the engine 10 (e.g. a rotation speed of the crank shaft) and an angular position of the engine 10 (e.g. a top dead center timing of each cylinder). The rotation detector 22 generates detection signals that are indicative of the detected rotation speed of the engine 10 and the detected angular position of the engine 10, and provides the detection signals to the controller 51. The controller 51 determines the rotation speed of the engine 10 and the angular position of the engine 10 based on the detection signals received from the rotation detector 22.

An atmospheric pressure detector 23 (e.g., an atmospheric pressure sensor, a sensor, a detector, and/or the like), that is provided in the control device 50, detects the atmospheric pressure, generates a detection signal indicative of the detected atmospheric pressure, and provides the detection signal to the controller 51. The controller 51 determines the atmospheric pressure based on the detection signal received from the atmospheric pressure detector 23.

A coolant temperature detector 28 (e.g., a coolant thermometer, a sensor, a detector, and/or the like), that is disposed in the cylinder block of the engine 10, detects the temperature of coolant that flows through a water jacket formed in the cylinder block and that is used for cooling the engine 10, generates a detection signal indicative of the detected coolant temperature, and provides the detection signal to the controller 51. The controller 51 determines the temperature of the coolant based on the detection signal received from the coolant temperature detector 28.

An ignition detector 71 (e.g., an ignition switch detector, a sensor, a detector, and/or the like), detects whether the ignition switch is associated with a first state (e.g., an ON state) or a second state (e.g., an OFF state), generates a detection signal indicative of the state of the ignition switch (e.g., ON or OFF), and provides the detection signal to the controller 51. The controller 51 determines the state of the ignition switch (e.g., whether the ignition is turned ON or OFF) based on the detection signal received from the ignition detector 71.

As described elsewhere herein, the control device 50 includes the controller 51 and the memory 53. The controller 51 is implemented in hardware, firmware, or a combination of hardware and software. The controller 51 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. The controller 51 may include one or more processors capable of being programmed to perform a function. The memory 53 may include a random access memory (RAM), a read only memory (ROM), and/or another type of dynamic or static storage device (e.g., a flash memory, a magnetic memory, an optical memory, etc.) that stores information and/or instructions for use by the controller 51.

The controller 51 determines an operating condition of the engine 10 based on various detection signals received from the above-described various detectors, generates command signals, and provides the command signals to control various devices such as the injectors 43A, 43B, 43C, 43D, the EGR valve 14A, the driving device 31 of the variable nozzle 33, a throttle motor 47M, the electric supercharger 61, the ABV 62, and/or the like. In addition, the controller 51 determines an amount of fuel supplied to the injectors 43A, 43B, 43C, 43D based on signals (e.g., injection instruction signals) generated by the controller 51, and provided to the injectors 43A, 43B, 43C, 43D, Inputs to and outputs from the controller 51 are not limited to the example shown in FIG. 1. For example, other implementations include various signals that may be transferred between the controller 51 and various devices, such as a nitrous oxide (NOx) detector, an exhaust gas temperature detector, actuators such as valves and lamps, and/or the like. The memory 53 of the control device 50 includes a Flash-ROM which stores a program for a cleaning control process, as described elsewhere herein.

Figure 2:
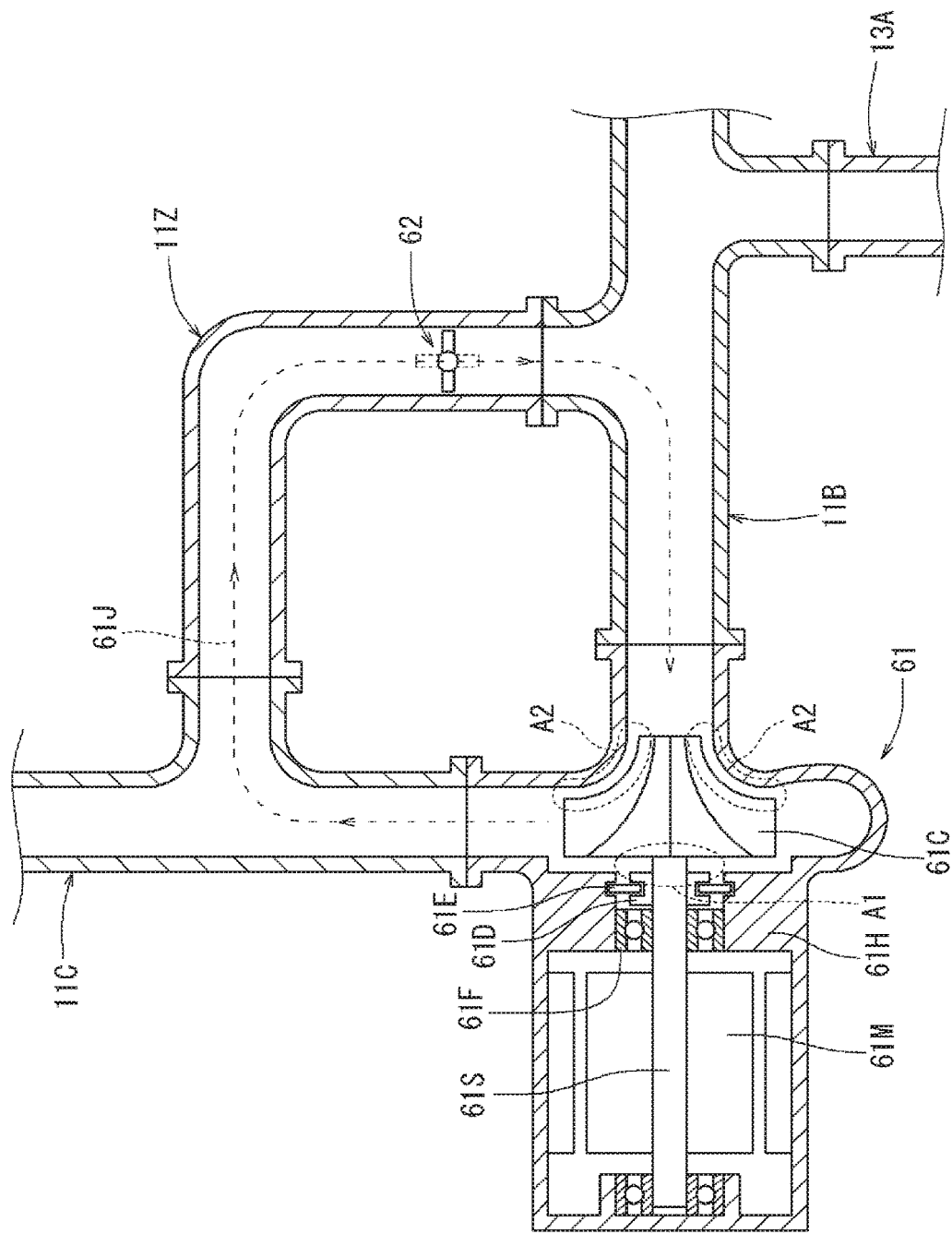
FIG. 2 is a partially enlarged view of FIG. 1 around an electric supercharger, showing a structure of a compressor wheel and its related parts, locations where deposit tends to be accumulated around the compressor wheel, and a cleaning passage during the cleaning of the compressor wheel.

Referring to FIG. 2, the electric supercharger 61 includes a housing 61H, an electric motor 61M, and the compressor wheel 61C. The electric motor 61M includes a three-phase motor having U-phase, V-phase and W-phase coils, and is connected to the compressor wheel 61C via a shaft 61S. The shaft 61S is supported by the housing 61H, and is rotatable via a bearing 61F. A metal sealing collar 61D is fixed on the shaft 61S. A metal sealing ring 61E having a C-shape is fitted to a recess formed in the outer peripheral surface of the sealing collar 61D. The sealing ring 61E provides a sealing in a space between the housing 61H and the shaft 61S.

The EGR passage 13A is connected to the second intake passage 11B, and exhaust gas in the EGR passage 13A flows into the second intake passage 11B through the EGR passage 13A. When the electric motor 61M is rotated and when the ABV 62 in the bypass passage 11Z is closed, intake air, including exhaust gas, in the second intake passage 11B is pressurized by the compressor wheel 61C and is discharged to the third intake passage 11C. The exhaust gas that flows from the EGR passage 13A into the second intake passage 11B contains various contaminant substances such as particulate matter. Such substances may be accumulated as deposit on the outer peripheral surface of the shaft 61S in the area A1 shown in FIG. 2, in the space between the housing 61H and the sealing ring 61E, on the inner wall surface of the housing 61H in the area A2, on the surface of the compressor wheel 61C, and/or on other surfaces.

Deposit on the inner wall surface of the housing 61H disturbs the airstream generated by the electric supercharger 61, which may cause degradation of the supercharging performance of the electric supercharger 61. Deposit on the shaft 61S and in the space between the housing 61H and the sealing ring 61E increases the sliding resistance, which may increase the consumption of the electric power by the electric supercharger 61 and also affects the supercharging performance of the electric supercharger 61. Furthermore, deposit on the surface of the compressor wheel 61C disturbs the airstream generated by the compressor wheel 61C, which may cause degradation of the supercharging performance of the electric supercharger 61 and also increase the electric consumption of the electric supercharger 61 due to an increase of the rotation moment of the compressor wheel 61C, i.e. an increased the weight of the compressor wheel 61C.

According to the present embodiment, deposit accumulated on the electric supercharger 61 is removed effectively by performing a first cleaning process, which will be described in detail elsewhere herein, in which the electric supercharger 61, including the compressor wheel 61C, the shaft 61S, and the housing 61H are vibrated, thereby permitting deposit to be removed more effectively than as compared to situations where deposit is removed based on centrifugal force and airstream. Because the rotation speed of the compressor wheel 61C can reach nearly 100,000 rpm, the compressor wheel 61C is designed to suppress the vibration which may negatively affect the durability of the compressor wheel 61C. Thus, vibration might not occur in the compressor wheel 61C under normal operation of the electric motor 61M. In order to cause forced vibration, the electric motor 61M is operated in a stepping manner in accordance with the first cleaning process.

Figure 3C:
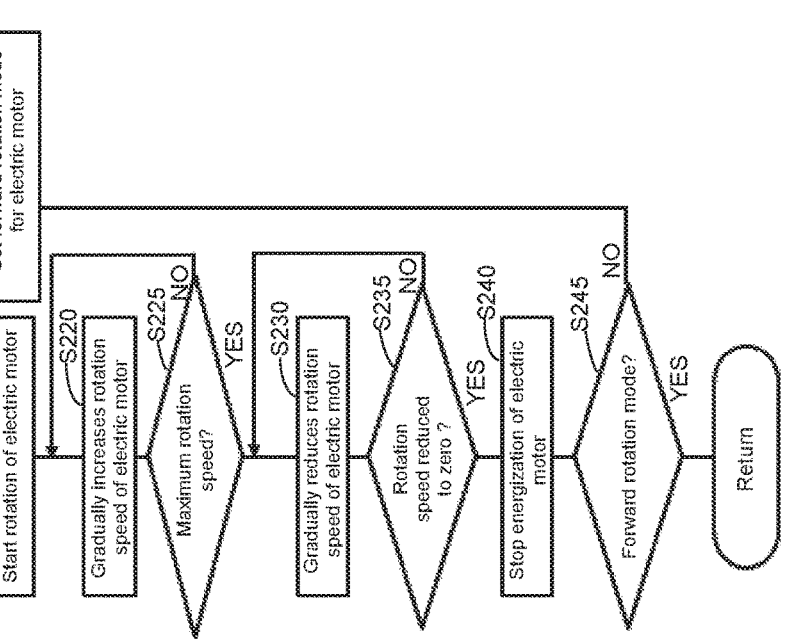
FIGS. 3A-3C are flow charts of control process for cleaning the electric supercharger.
Figure 3B:
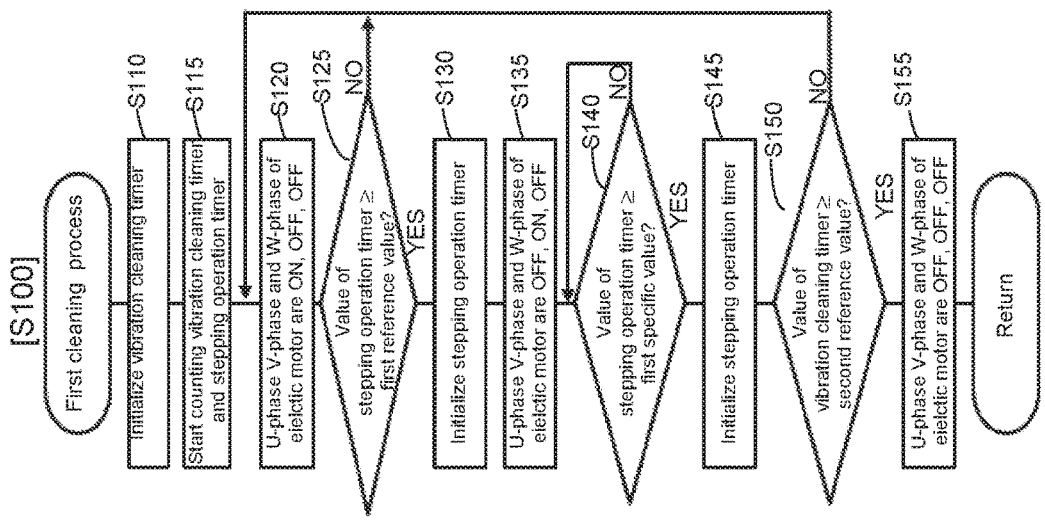
Figure 3A:
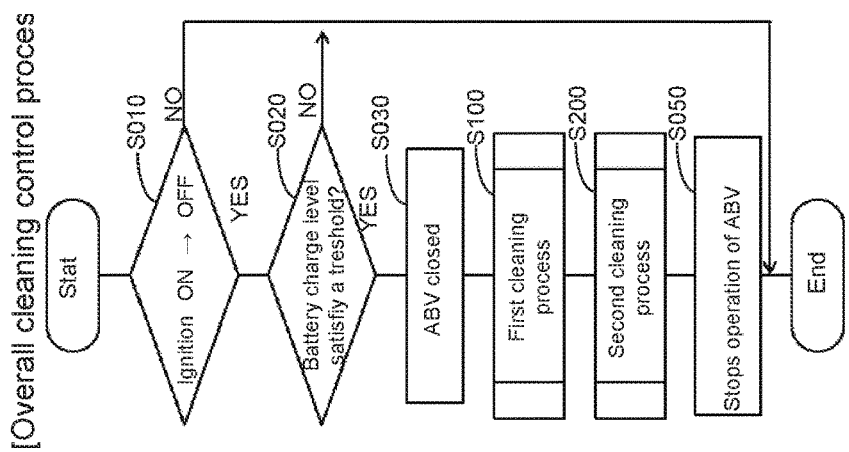

The following will describe the cleaning control process for cleaning the electric supercharger 61 under the control by the control device 50 with reference to the flow charts shown in FIGS. 3A-3C. The cleaning control process of the present embodiment includes the above-mentioned first cleaning process and a second cleaning process. The control device 50 (e.g., the controller 51) activates the cleaning control process within a specific period of time at a predetermined timing, and the cleaning control process proceeds to S010.

As shown in FIG. 3A, and at Step S010, the control device 50 determines whether the ignition is transitioned from a first state (e.g., ON) to a second state (e.g., OFF). If the ignition is transitioned from the first state to the second state (YES), then the control device 50 stores data corresponding to the current state of the ignition (e.g., ignition OFF) in the memory 53 and the cleaning control process proceeds to Step S020. If the ignition is not transitioned from the first state to the second state (NO) at Step S010, then data corresponding to the current state of the ignition (e.g., ignition ON) is stored in the memory 53 and the overall cleaning control process ends. The control device 50 determines that ignition is transitioned to the first state (e.g., ON) from the second state (e.g., OFF) when the state of the ignition stored in the memory 53 at the previous process is ON and the state of the current ignition detected at the current cleaning control process is OFF.

As further shown in FIG. 3A, and at Step S020, the control device 50 determines a charge condition of the battery (e.g., whether the battery includes a charge level that satisfies a threshold charge level such as to permit the cleaning control process to be performed). If the battery includes a charge level that satisfies the threshold charge level (YES), then the cleaning control process proceeds to Step S030. If the battery includes a charge level that does not satisfy the threshold charge level (NO), then the control device 50 ends the overall cleaning control process. When determining the charge condition of battery, the control device 50 obtains data indicative of the state of battery charge (e.g., by receiving a detection signal from a battery voltage sensor (not shown) or battery information from a battery controller (not shown), and compares the data with the threshold charge level stored in the memory 53. The threshold charge level is predetermined by experimentation results, and data corresponding to the threshold charge value is stored in the memory 53.

As further shown in FIG. 3A, and at Step S030, the control device 50 causes the ABV 62 to be opened and the cleaning control process proceeds to the first subroutine S100 as shown in FIG. 3B.

Figure 4:
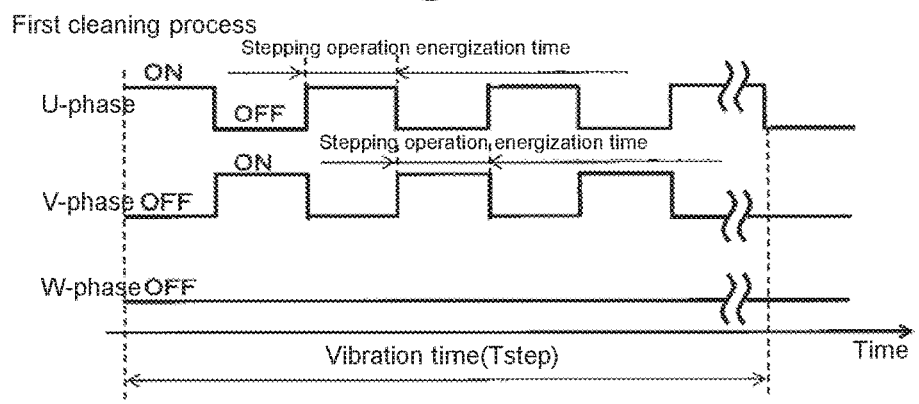
FIG. 4 is a chart indicating a control waveform pattern in the stepping operation of the electric motor during a vibrating time in a first cleaning process shown in FIGS. 3A-3C.

As shown in FIG. 3B, the first cleaning process corresponding to the first subroutine S100 will be described as follows. Referring to FIG. 4, in the first cleaning process, which is carried out in accordance with the steps of the first subroutine S100 (FIG. 3B), the control device 50 causes the electric motor 61M to perform a stepping operation in which the electric motor 61M is alternately and repeatedly rotated in a first direction and a second direction. For example, the electric motor 61M is rotated 120 degrees in a forward direction, and is then rotated 120 degrees in a reverse direction. The stepping operation of the electric motor 61M may be accomplished by energizing the electric motor 61M in such a manner that a first energized state in which the U-phase, V-phase and W-phase are ON, OFF and OFF, respectively, and a second energized state in which the U-phase, V-phase and W-phase are OFF, ON and OFF, respectively, are repeated. As a result, vibration is forcefully generated by rapid acceleration and rapid stopping of the electric motor 61M. Although the electric motor 61M may be stepped in one direction without being reversed by energizing the U-phase, V-phase and W-phase in turn, the electric motor 61M is rotated alternately in forward and reverse directions by alternately energizing the U-phase and V-phase according to the stepping operation of the electric motor 61M of the present embodiment, which causes rapid stopping and rapid acceleration in alternate directions, thereby generating larger vibration than as compared to a situation where the electric motor 61M is stepped in one direction. Each of the first state and the second state are maintained for a stepping operation energization time, or first reference value (FIG. 4). The first cleaning process, or the stepping operation of the electric supercharger, continues for a second reference value, or a vibration time (Tstep), as shown in FIG. 5. In other words, acceleration and stopping of the compressor wheel 61C is repeated for the vibration time within a predetermined cleaning time.

Referring to FIG. 3B, the following will describe the first subroutine S100 corresponding to the first cleaning process in detail. As shown in FIG. 3B, and at step S110, the control device 50 initializes a vibration cleaning timer and a stepping operation tinier, and the control process proceeds to Step S115. The vibration cleaning timer and the stepping operation timer are provided in the control device 50 and may be used for counting the vibration time and the energization time, respectively. The vibration cleaning timer and the stepping operation timer start counting the time from zero at a predetermined interval. The vibration cleaning timer and the stepping operation timer include respective maximum counting values that are greater than the first reference value and the second reference value, respectively.

As further shown in FIG. 3B, and at step S115, the control device 50 causes the vibration cleaning timer and the stepping operation timer to start counting, and the control process proceeds to Step S120. It is to be noted that counting of the vibration cleaning timer and the stepping operation timer is not stopped by initializing the timers. Instead, the counting is continued until the end of the first subroutine S100.

As further shown in FIG. 3B, and at Step S120, the control device 50 causes the electric motor 61M to be energized in the first energized state in which the U-phase, V-phase and W-phase are ON, OFF and OFF, respectively, and the control process proceeds to Step S125. The electric motor 61M is rotated in a stepping manner to a position led by the state of energization of the electric motor 61M.

As further shown in FIG. 3B, and at Step S125, the control device 50 determines whether the value counted by the stepping operation timer is equal to or greater than the first reference value. If the value counted by the stepping operation timer is equal to or greater than the first reference value (YES), then the cleaning control process proceeds to Step S130. If the value counted by the stepping operation timer is not equal to or greater than the first reference value (NO), then the cleaning control process returns to Step S120. At Steps S120 and S125, the electric motor 61M maintains its angular position, that is determined by the first energized state of the electric motor 61M with the U-phase, V-phase and W-phase being ON, OFF, and OFF, respectively, for the stepping operation energization time. The first reference value corresponds to a period of time (e.g., 0.05 seconds, 0.10 seconds, etc.) during which the electric motor 61M is energized in a particular state. The first reference value is predetermined by experimentation results, and the first reference value is stored in the memory 53.

As further shown in FIG. 3B, and at Step S130, the control device 50 initializes the value counted by the stepping operation timer, and the control process proceeds to Step 3135. As described elsewhere herein, counting continues after initializing the counted value such that the stepping operation timer continues counting and immediately starts counting from zero after initializing the stepping operation timer.

As further shown in FIG. 3B, and at Step S135, the control device 50 causes the electric motor 61M to be energized in the second energized state in which the U-phase, V-phase and W-phase are OFF, ON, and OFF, respectively, and the cleaning control process proceeds to Step S140. The electric motor 61M is rotated in a stepping manner to a position led by the second energized state of the electric motor 61M (U-phase, V-phase and W-phase are OFF, ON, and OFF) from the position where the electric motor 61M is positioned by the first energized state (U-phase, V-phase and W-phase being ON, OFF and OFF, respectively). In this way, the shaft of the electric motor 61M is rotated 120 degrees from the position determined at Step S120.

As further shown in FIG. 3B, and at Step S140, the control device 50 determines whether the value counted by the stepping operation timer is equal to or greater than the first reference value. If the value counted by the stepping operation timer is equal to or greater than the first reference value (YES), then the control process proceeds to Step S145. If the value counted by the stepping operation timer is not equal to or greater than the first reference value (NO), then the control process returns to Step S135. At Steps S140 and S145, the electric motor 61M maintains its angular position, that is determined by the second energized state of the electric motor 61M with the U-phase, V-phase and W-phase being OFF, ON and OFF, respectively, for the stepping operation energization time.

As further shown in FIG. 3B, and at Step S145, the control device 50 initializes the value counted by the stepping operation timer, and the cleaning control process proceeds to Step S150. Counting continues after initializing the stepping operation timer. The stepping operation timer immediately starts counting from zero after initialization of the stepping operation timer.

As further shown in FIG. 3B, and at Step S150, the control device 50 determines whether the value counted by the vibration cleaning timer is equal to or greater than the second reference value. If the value counted by the vibration cleaning timer is not equal to or greater than the second reference value (NO), then the cleaning control process returns to Step S120. If the value counted by the vibration cleaning timer is equal to or greater than the second reference value (YES), then the cleaning control process proceeds to Step S155. The second reference value corresponds to the vibration time (Tstep), which is predetermined and stored in the memory 53. The vibration time (Tstep) is set about one second (e.g., 0.9 seconds, 1.1 seconds, etc.).

As further shown in FIG. 3B, and at Step S155, the control device 50 stops energizing the electric motor 61M of the electric supercharger 61. Specifically, the U-phase, V-phase and W-phase are OFF, OFF and OFF, respectively, and the cleaning control process returns to the overall cleaning control process and proceeds to the second subroutine S200 corresponding to the second cleaning process, as shown in FIG. 3C.

Figure 5A:
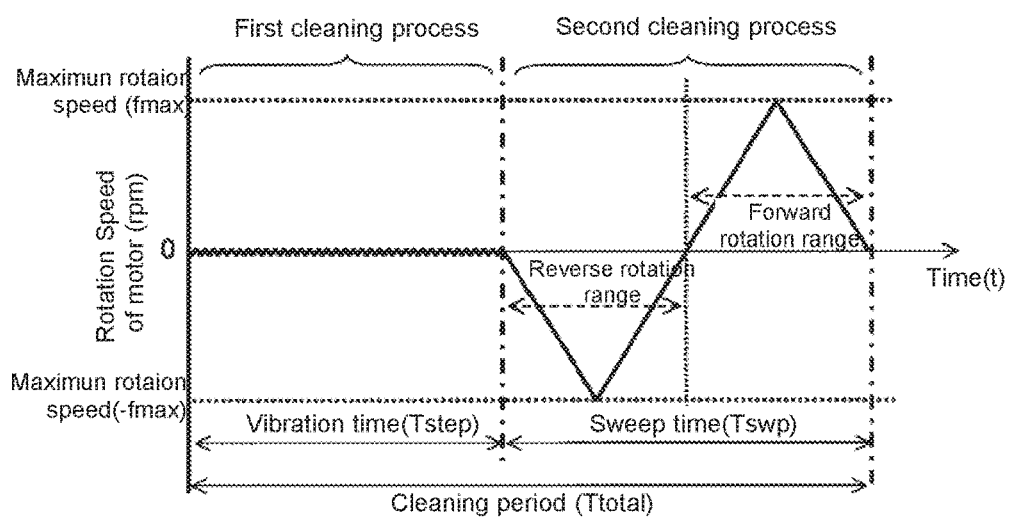
FIGS. 5A and 5B are charts indicating the rotation speed of the compressor wheel in the first and second cleaning processes.
Figure 5B:
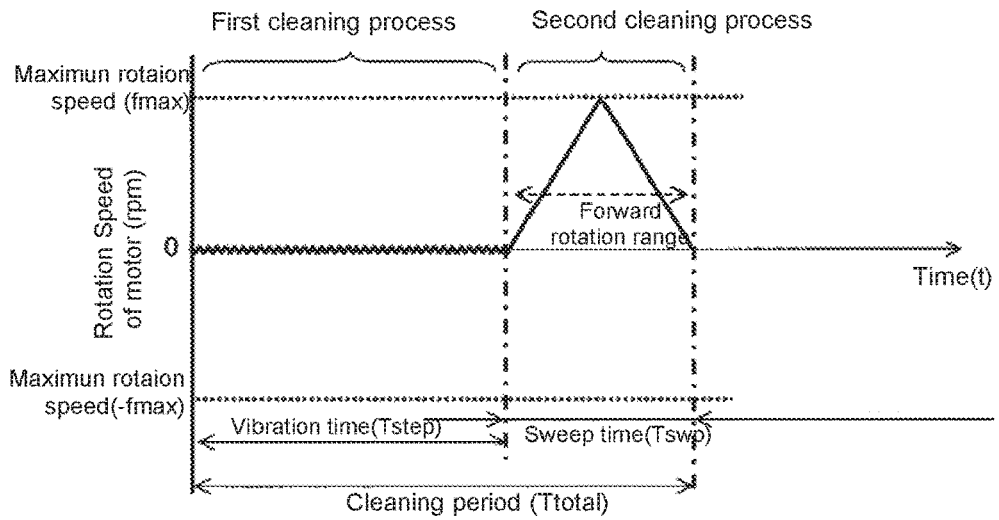

Referring to FIG. 3C, the following will describe the outline of the second cleaning process corresponding to the second subroutine S200. In the second subroutine S200, the control device 50 initiates a sweep operation of the electric supercharger 61 in which a series of operations is performed by the electric motor 61M with the ABV 62 opened. In the sweep operation, the electric motor 61M of the compressor wheel 61C is configured to be rotated in a first direction, which is one of the forward direction or the reverse direction, until the rotation speed of the compressor wheel 61C satisfies the predetermined rotation speed and subsequently, the compressor wheel 61C is rotated in a second direction, which is different than the first direction, until the rotation speed of the compressor wheel 61C satisfies the predetermined rotation speed. For example, with the ABV 62 kept opened, the electric motor 61M is rotates in a reverse direction, and its rotation speed is gradually increased to a predetermined maximum rotation speed in the reverse direction for the sweep operation (e.g., shown as −fmax in FIG. 5A) and is then reduced gradually to zero. Subsequently, the electric motor 61M is rotated in a forward direction and the rotation speed of the electric motor 61M is gradually increased to a predetermined maximum rotation speed in the forward direction for the sweep operation (e.g., shown as fmax in FIG. 5A) and is then reduced gradually to zero, as shown in FIG. 5A. It is to be noted that the compressor wheel 61C may be rotated in the forward direction and, subsequently, the compressor wheel 61C is rotated in the reverse direction. The speed operation may start with rotation of the electric motor 61M in the forward direction and compressor wheel 61C. The period of time for which the second subroutine S200 occurs corresponds to the sweep time (Tswp) shown in FIG. 5A. When the second subroutine S200 for the sweep operation is performed with the ABV 62 kept opened, an airstream is created in the cleaning passage 61J as indicated by a dotted arrow in FIG. 2 In this way, deposit removed by vibration generated by the stepping operation performed in accordance with the first subroutine S100 is moved by the airstream, which is generated by the sweeping operation performed in accordance with the second subroutine S200, in the direction in which the centrifugal force of the airstream acts. In other words, the deposit that is removed and dropped in the electric supercharger 61 by the first subroutine S100 is moved by an airstream generated in accordance with the second subroutine S200.

Referring to FIG. 3C, the following will describe in detail the second cleaning process corresponding to the second subroutine S200. As shown in FIG. 3C, and at Step S210, the control device 50 sets the reverse rotation mode for the electric motor 61M of the compressor wheel 61C of the electric supercharger 61, and the cleaning control process proceeds to Step 3215. The rotation mode of the electric motor 61M is set in an electric motor controller (not shown) of the control device 50.

As further shown in FIG. 3C, and at Step S215, the control device 50 causes energization of the coils of the electric motor 61M of the compressor wheel 61C, and causes the electric motor 61M and the compressor wheel 61C to start rotating, and the control process proceeds to Step S220.

As further shown in FIG. 3C, and at Step S220, the control device 50 causes the electric motor 61M of the electric supercharger 61 to gradually increase its rotation speed, and the control process proceeds to step S225. A specific increase value is added to the rotation speed of the electric motor 61M just before Step S220 for an increase of the rotation speed of the electric motor 61M at Step S220. The specific increase value is predetermined and is stored in the memory 53.

As further shown in FIG. 3C, and at Step S225, the control device determines whether the rotation speed of the electric motor 61M satisfies a predetermined rotation speed. The predetermined rotation speed may be equal to or slightly less than a maximum rotation speed of the electric motor 61M. If the rotation speed of the electric motor 61M satisfies the predetermined rotation speed (YES), then the cleaning control process proceeds to Step S230. If the rotation speed of the electric motor 61M does not satisfy the predetermined rotation speed (NO), then the control process returns to Step S220. The predetermined rotation speed is predetermined by experimentation results, and is stored in the memory 53.

As further shown in FIG. 3C, and at step S230, the control device 50 causes the electric motor 61M to gradually reduce its rotation speed, and the control process proceeds to Step S235. The reduction of the rotation speed is not required to correspond to the specific increase value mentioned in the description of Step S220, but the reduction of the rotation speed may be determined by subtracting a specific reduction value from the rotation speed at a point just before Step S230. In this case, a specific reduction value is stored in the memory 53.

As further shown in FIG. 3C, and at Step S235, the control device 50 determines whether the rotation speed of the electric motor 61M is zero. If the rotation speed is zero (YES), then the control process proceeds to Step S240. If the rotation speed is not zero (NO), then the cleaning control process returns to Step S230.

As further shown in FIG. 3C, and at Step S240, the control device 50 stops the energization of the coil of the electric motor 61M to stop rotation of the electric motor 61M and the compressor wheel 61C, and the cleaning control process proceeds to Step S245.

As further shown in FIG. 3C, and at Step S245, the control device 50 determines whether the rotation mode of the electric motor 61M is set to the forward rotation mode. If the rotation mode is set to the forward rotation mode (YES), then the second subroutine S200 ends, the cleaning control process returns to the overall cleaning control process (FIG. 3A), and the cleaning control process proceeds to Step S050. If the rotation mode is not set to the forward rotation mode (NO), then the cleaning control process proceeds to Step S250. The control device 50 determines the rotation mode of the electric motor 61M based on information relating to the rotation mode that is stored in the electric motor controller.

As further shown in FIG. 3C, and at step S250, the control device 50 sets the rotation mode of the electric motor 61M to the forward rotation mode, and the cleaning control process proceeds to Step S215. Subsequently, Steps S215 through S240 are performed with the electric motor 61M set in the forward rotation mode. (See forward rotation range in FIG. 5A.)

As further shown in FIG. 3A, and at step S050 in the overall cleaning control process, the control device 50 stops operation of the ABV 62, and the control device 50 ends the overall cleaning control process.

According to the present embodiment, the sweep operation is performed by rotating the electric motor 61M once in the reverse and forward directions, though the sweep operation may be performed by rotating the electric motor 61M once only in the forward direction. In this case, the process performed at Step S210 in the flow chart in FIG. 3C is modified such that the control device 50 sets the forward rotation mode for the operation of the electric motor 61M of the compressor wheel 61O of the electric supercharger 61. In addition, Steps relating to changing the operation mode of the electric motor 61M, namely Steps S245, S250, are not performed. The sweep operation may be performed by rotating the electric motor 61M once only in the reverse direction. In such case, Steps S245, S250 are not performed. For the sweep operation, rotation of the electric motor 61M in the forward and reverse directions may be performed any number of times.

The following will describe the effects of the present embodiment. As described elsewhere herein, the first cleaning process corresponding to the first subroutine S100, and the second cleaning process corresponding to the second subroutine S200 are performed within the predetermined cleaning time (Ttotal) (FIGS. 5A and 5B) after the operation of the internal combustion engine is stopped. During the first cleaning process, the control device 50 causes vibration of the compressor wheel 61C for the vibration time (Tstep) within the cleaning time (Ttotal), to thereby permit removal of deposit accumulated on the compressor wheel 61C and its surrounding parts more effectively as compared to situations in which deposit is removed by way of airflow and centrifugal force. In the second cleaning process, with the cleaning passage 61J formed by opening the ABV 62, deposit is forcefully blown into the cleaning passage 61J by centrifugal force and an airstream generated by the sweep operation of the compressor wheel 61C, thereby permitting the deposit to be removed effectively.

According to the present embodiment, the first and second cleaning processes are performed after the ABV 62 is opened in the overall cleaning procedure, but the ABV 62 is opened after the first cleaning process. In other words, the ABV 62 is not required to be opened during the first cleaning process as long as the ABV 62 is opened during the second cleaning process.

The control system of the internal combustion engine according to the present disclosure is not limited to the above-described configuration, structure or control procedures, and may be modified in various manners within the scope of the present disclosure.

The control system of the internal combustion engine according to the present disclosure is applicable to any type of vehicle equipped with an internal combustion engine.

Values used in the description of the present embodiment are examples and are not intended to limit the scope of the present disclosure. Some implementations are described herein in connection with thresholds and/or other types of values. As used herein, satisfying may refer to being greater than, more than, higher than, or greater than or equal to.

According to the present embodiment, the second cleaning process is not required to be performed as part of the overall cleaning control process.

What is claimed is:

1. A control system for an internal combustion engine comprising:
   an electric supercharger that is disposed in an intake passage of the internal combustion engine and that includes a compressor wheel that is configured to be rotated by an electric motor;
   a bypass passage having a first end that is connected to a first part of the intake passage that is upstream of the electric supercharger, and a second end that is connected to a second part of the intake passage that is downstream of the electric supercharger to thereby permit bypass of the electric supercharger via the bypass passage;
   a bypass valve that is disposed in the bypass passage and is configured to open and close the bypass passage;
   an exhaust gas recirculation (EGR) passage connecting an exhaust passage of the internal combustion engine and the first part of the intake passage that is upstream of the electric supercharger; and
   a control device configured to control the electric supercharger and the bypass valve based on an operating condition of the internal combustion engine, wherein
   the control device is configured to cause a stepping operation of the electric supercharger in which acceleration and stopping of the compressor wheel are repeated within a predetermined cleaning time after operation of the internal combustion engine is stopped.

2. The control system for the internal combustion engine according to claim 1, wherein the compressor wheel is configured to be rotated in a forward direction and a reverse direction, alternately and repeatedly, during the stepping operation of the electric supercharger.

3. The control system for the internal combustion engine according to claim 1, wherein the control device is configured to cause a sweep operation of the electric supercharger within the predetermined cleaning time and after the stepping operation, wherein the compressor wheel is configured to be rotated in at least one of a forward direction or a reverse direction until a rotation speed of the compressor wheel satisfies a predetermined rotation speed during the sweep operation of the electric supercharger, and wherein the bypass valve is configured to be opened during the sweep operation of the electric supercharger.

4. The control system for the internal combustion engine according to claim 3, wherein the predetermined rotation speed is a maximum rotation speed, and wherein the compressor wheel is configured to be rotated in a first direction until the rotation speed of the compressor wheel satisfies the maximum rotation speed and, subsequently, the compressor wheel is rotated in a second direction until the rotation speed of the compressor wheel satisfies the maximum rotation speed, and wherein the first direction is one of the forward direction or the reverse direction, and wherein the second direction is different than the first direction.

* * * * *